No. 691,146. Patented Jan. 14, 1902.
J. V. JANIN.
LEVEL AND PLUMB.
(Application filed May 21, 1901.)
(No Model.) 2 Sheets—Sheet 1.
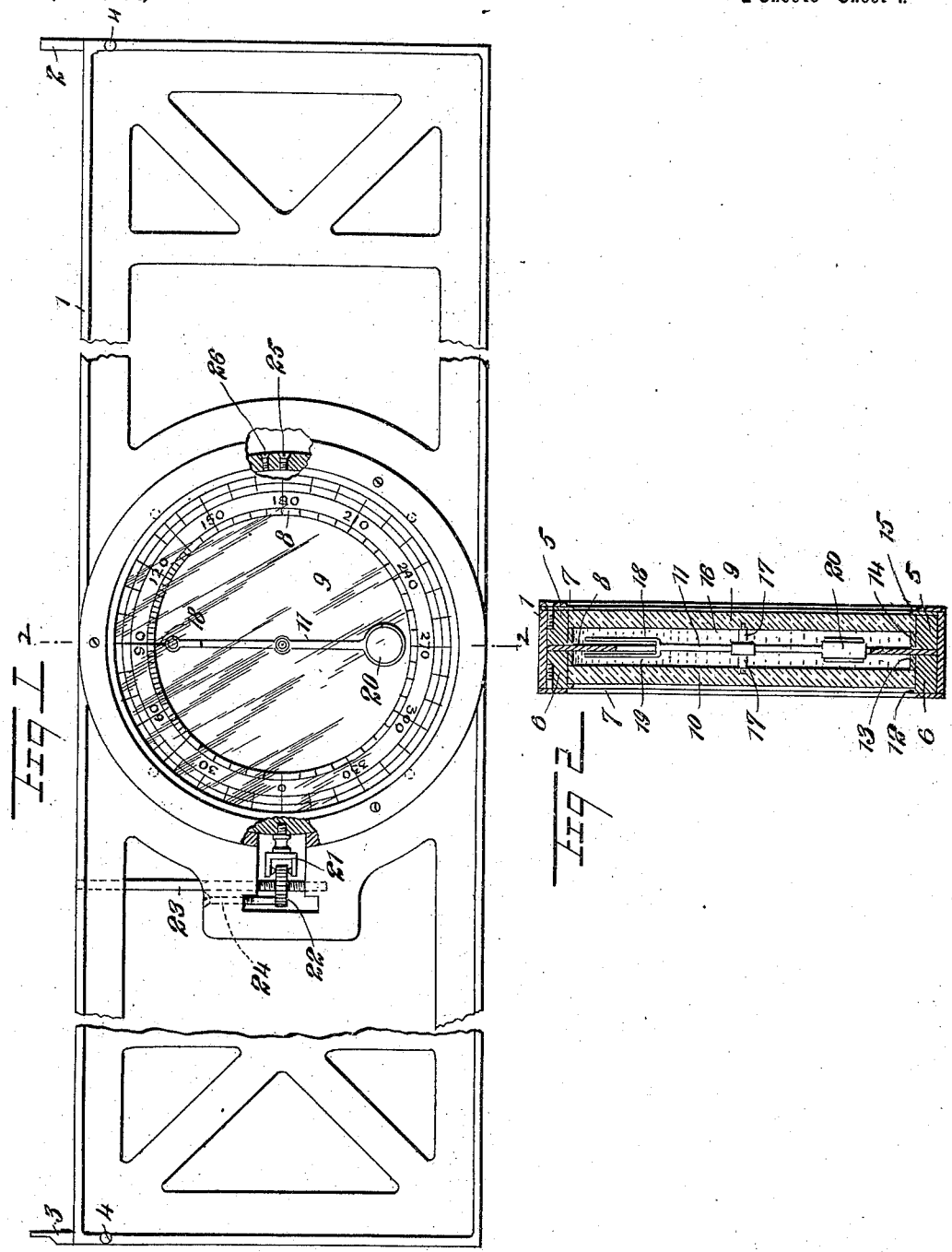
WITNESSES:
INVENTOR
John V. Janin
BY
ATTORNEYS No. 691,146. Patented Jan. 14, 1902.
J. V. JANIN.
LEVEL AND PLUMB.
(Application filed May 21, 1901.)
(No Model.) 2 Sheets—Sheet 2.
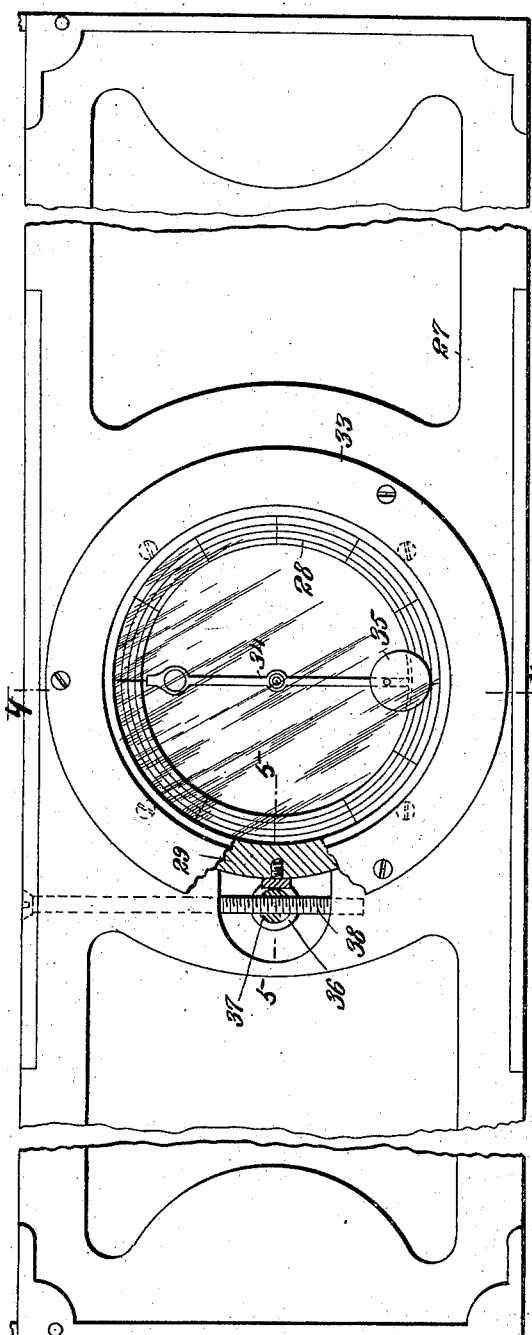
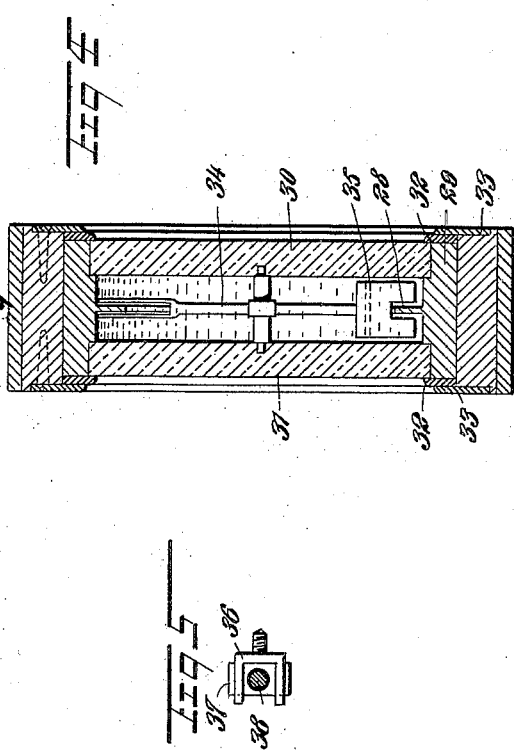
WITNESSES:
H. Walker
C. R. Ferguson
INVENTOR
John V. Janin
BY
ATTORNEYS

UNITED STATES PATENT OFFICE.

JOHN VALENTINE JANIN, OF SEATTLE, WASHINGTON, ASSIGNOR OF ONE-HALF TO CONSTANT CLAEYS, OF SEATTLE, WASHINGTON.

LEVEL AND PLUMB.

SPECIFICATION forming part of Letters Patent No. 691,146, dated January 14, 1902.

Application filed May 21, 1901. Serial No. 61,230. (No model.)

*To all whom it may concern:*

Be it known that I, JOHN VALENTINE JANIN, a citizen of the United States, and a resident of Seattle, in the county of King and State of Washington, have invented a new and Improved Level and Plumb, of which the following is a full, clear, and exact description.

This invention relates to improvements in levels and plumbs; and the object is to provide an instrument of this character by means of which angles in building operations may be readily determined and also for finding any cut desired.

I will describe a level and plumb embodying my invention and then point out the novel features in the appended claims.

Reference is to be had to the accompanying drawings, forming a part of this specification, in which similar characters of reference indicate corresponding parts in all the figures.

Figure 1 is a face view of a level and plumb embodying my invention. Fig. 2 is a section on the line 2 2 of Fig. 1. Fig. 3 is a face view showing a modification in the level and plumb. Fig. 4 is a section on the line 4 4 of Fig. 3, and Fig. 5 is a section on the line 5 5 of Fig. 3.

Referring first to the example of my improvement shown in Figs. 1 and 2, 1 designates the body of the instrument, which may be made of metal, such as iron, and for the sake of lightness I make it in skeleton form. At the ends at one edge are sights 2 3, these sights being mounted on pivots 4, so that they may be turned downward against the ends of the body or in recesses formed in the ends. In a circular opening at the center of the body are arranged rings 5 and 6. These rings are held in place by face-rings 7, through which screws pass into said rings 5 and 6.

Arranged between the rings 5 and 6 is a scale-ring 8, on the opposite sides of which degrees of an angle are marked. Glass disks 9 and 10 form the walls of a chamber in which a needle or indicator 11 is designed to operate. The glass wall 10 at its outer edge engages against an annular flange 12 on the ring 6, and its inner edge abuts against a packing-strip 13. The inner edge of the glass 9 abuts against a packing-strip 14, and its outer edge is held by a locking-ring 15. The inner edges of the packing-strips 13 and 14 bear closely against the scale-ring 8, thus making the chamber liquid-tight, as it is intended to place in the chamber a liquid 16, as oil or the like, which will prevent undue vibration of the needle 11.

The needle 11 is provided at about its center with trunnions 17, which have bearings in the inner sides of the glass walls. If desired, however, the bearings may be jeweled. On one end of the needle are two pointers 18 and 19, designed to indicate on the scale on the opposite sides of the ring 8. The object of this is so that the degree of inclination or standing of the level or plumb may be observed conveniently from either side. The needle is held substantially in vertical line by means of a weight 20 on its lower end. The weight may be in the form of a hollow ball filled with mercury and secured in any suitable manner.

After placing the device in the body portion a slight adjustment of the instrument may be required. For this reason I connect a yoke 21 with the scale-ring 8, and between the members of this yoke a nut 22 operates. This nut is mounted on a screw-rod 23, which extends outward to the outer edge of the body portion, where it may be engaged by a suitable tool for turning it. Obviously by turning the nut 22 the nut will cause a movement of the scale-ring, and when the adjustment is made a screw 24, operating in the frame, is designed to be engaged with the nut 22, as clearly indicated in Fig. 1.

To permit the pouring of oil into the chamber containing the needle, I provide in one of the rings 5 or 6 an opening normally closed by a screw 25, and an opening is also provided for the escape of air while pouring in the liquid, this escape-hole being normally closed by a screw 26.

The device shown in Figs. 3 and 4 is substantially the same as the device described, but in this instance the body portion 27 may consist of wood. In this example the scale-ring 28 is in the shape of a flange on the interior of a ring 29, which forms an abutment for the glass walls 30 and 31. These glass walls are engaged at their outer edges by rings 32, which are held in place by rings 33, secured to the body portion. The needle 34 in this modification is mounted in a similar manner to the needle first described, but it has attached to its lower end a weight 35, which is slotted to engage over the scale-ring 28.

As a means for adjusting the leveling device in the body a yoke 36 is connected to the ring 29, and mounted to oscillate in this yoke is a nut 37, which is engaged by a screw-rod 38, extended outward to the edge of the body, where it may be engaged by a screwdriver or the like.

Having thus described my invention, I claim as new and desire to secure by Letters Patent—

1. A plumb or level, comprising a frame, an adjusting-screw mounted upon the same and provided with a thumb-nut, a locking-screw mounted upon the frame and free to engage said thumb-nut, so as to clamp the same in a fixed position, and a cylindrical member journaled in said frame and connected with said adjusting-screw.

2. A plumb or level, comprising a frame, an adjusting-screw mounted upon the same and provided with a nut, a locking-screw mounted upon the frame parallel with said adjusting-screw and free to engage said nut, so as to secure the same in a fixed position, and a cylindrical member loosely mounted within the frame and provided with a rigid yoke straddling the edge of said nut and free to move therewith to a limited extent.

3. A plumb or level, comprising a frame, an adjusting-screw mounted therein and normally free to move lengthwise of its axis, a nut fixed upon said screw and movable therewith, a locking-screw mounted upon said frame, parallel with said adjusting-screw, and free to engage one face of said nut so as to lock the same against rotation, and a cylindrical member journaled in said frame and provided with a yoke extending radially therefrom, straddling the edge of the nut opposite said locking-screw.

In testimony whereof I have signed my name to this specification in the presence of two subscribing witnesses.

JOHN VALENTINE JANIN.

Witnesses:
A. W. ANDERSON,
HERBERT STOKES.